(12) United States Patent
Wilson, III et al.

(10) Patent No.: US 9,267,022 B2
(45) Date of Patent: Feb. 23, 2016

(54) ANTI-TACK POWDER FOR UNCURED RUBBER PELLETS

(71) Applicant: Nike, Inc., Beaverton, OR (US)

(72) Inventors: Thomas W. Wilson, III, Hillsboro, OR (US); Feng-Ming Ou, Taichung (TW); Ping-Hung Tsai, Taichung (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/067,254

(22) Filed: Oct. 30, 2013

(65) Prior Publication Data

US 2015/0119517 A1    Apr. 30, 2015

(51) Int. Cl.
*C08L 21/00*    (2006.01)

(52) U.S. Cl.
CPC ........... *C08L 21/00* (2013.01); *C08L 2205/025* (2013.01); *C08L 2205/06* (2013.01)

(58) Field of Classification Search
CPC  C08L 21/00; C08L 2205/025; C08L 2205/06
See application file for complete search history.

(56) References Cited

U.S. PATENT DOCUMENTS

| | | | |
|---|---|---|---|
| 4,483,886 A | | 11/1984 | Kowalski |
| 5,510,419 A | | 4/1996 | Burgoyne et al. |
| 5,628,956 A | * | 5/1997 | Theusner et al. ............. 264/438 |
| 5,952,412 A | * | 9/1999 | Greenberg et al. ........... 524/270 |
| 2007/0173567 A1 | * | 7/2007 | Ishino .......................... 523/351 |

FOREIGN PATENT DOCUMENTS

| | | |
|---|---|---|
| EP | 0095898 A1 | 12/1983 |
| EP | 2204407 A1 | 7/2010 |

OTHER PUBLICATIONS www.http://rubber-powder.com/html/rubber_power.html, RP Recylingtechnik Gmbh, Rubber Powder, Jan. 30, 2014, three pages.
International Search Report with Written Opinion dated Mar. 4, 2015 in Application No. PCT/US2014/061493, 9 pages.

* cited by examiner

*Primary Examiner* — Robert Harlan

(74) *Attorney, Agent, or Firm* — Shook, Hardy & Bacon L.L.P.

(57) ABSTRACT

Rubber in its uncured state is very tacky and rubber forms such as pellets, sheets, etc., tend to be hard to process due to the agglomeration and sticking of these rubber forms. Aspects of the invention use cured rubber powder as an anti-tack agent in a molding rubber mixture. In one aspect, the cured rubber powder has a particle size between 50 and 250 μm in the uncured rubber forms, a diameter of between 1 and 10 mm, and a length of between 1 and 15 mm.

19 Claims, 9 Drawing Sheets

ANTI-TACK POWDER FOR UNCURED RUBBER PELLETS

TECHNICAL FIELD

Aspects of the invention relate to free-flowing rubber pellets.

BACKGROUND

Rubber is a versatile material with a vast number of uses, one of which is for the manufacture of shoe outsoles. The manufacturing of reproducible and consistent cured rubber products requires precise measurement and handling of the uncured rubber forms, such as rubber pellets, sheets, discs, cylinders, etc. Unfortunately, the precise handling of uncured rubber forms is challenging because uncured rubber forms can stick together and agglomerate.

Anti-tack agents have been developed to decrease uncured rubber's tackiness. Exemplary anti-tack agents include kaolin clay dispersed in a water and soap solution, chemicals such as sodium sulfate, sodium phosphate, etc., which may also be used in water dispersions. Fatty acid salts and ethylene bis-stearamide (EBS) are other examples of anti-tack agents used in the industry.

SUMMARY

Aspects of the present invention relate to improving the handling of rubber pellets using rubber powder as an anti-tack material. Aspects of the present invention generally relate to a rubber mixture comprising primarily uncured rubber and a cured rubber powder that acts as an anti-tack agent. As the rubber mixture may eventually be fed into a vulcanizing process, the mixture may include additional compounds used in the vulcanizing process. The rubber mixture consistent with aspects of the present invention may be defined by various attributes.

For example, the rubber mixture may be defined according to the size of the uncured rubber forms, the size of the cured rubber powder, and the powder percentage by weight of the powder to the uncured rubber (expressed in equation form as $P\% = W_{pd}/W_{p1} \times 100$, where $W_{pd}$ is the weight of powder in the rubber mixture and $W_{p1}$ is the weight of pellets in the rubber mixture). Aspects of the invention can further be defined by the composition of the cured rubber powder and the uncured rubber used to form the rubber mixture. Additionally, aspects of the invention may be defined by the resulting characteristics of rubber formed by vulcanizing (or curing) the rubber mixture. Finally, aspects of the present invention produce a rubber mixture that is free flowing. Mixing the cured rubber powder with the uncured rubber pellets provides a rubber mixture with improved handling characteristics that may be used to manufacture new rubber products from unvulcanized or uncured rubber pellets.

BRIEF DESCRIPTION OF THE SEVERAL VIEWS OF THE DRAWING

The present invention is described in detail below with reference to the attached drawing figures, wherein.

DESCRIPTION

Figure 2:
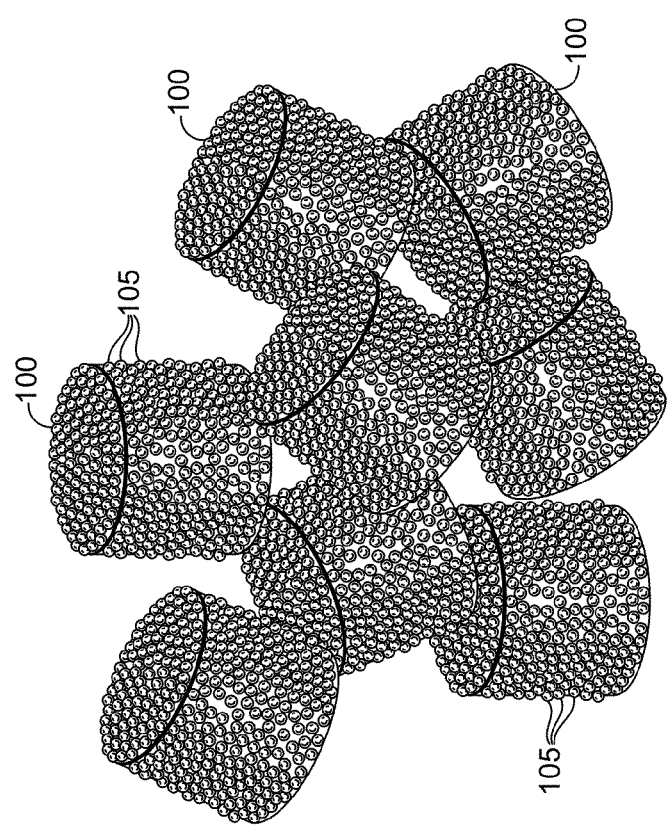
FIG. 2 is a diagram showing uncured rubber pellets coated with cured rubber powder, according to aspects of the present invention.

Aspects of the present invention generally relate to a rubber mixture comprising primarily uncured rubber and a cured rubber powder that acts as an anti-tack agent. As the rubber mixture may eventually be fed into a vulcanizing process, the mixture may include additional compounds used in the vulcanizing process. The rubber mixture consistent with aspects of the present invention may be defined by various attributes.

For example, the rubber mixture may be defined according to the size of the uncured rubber forms, the size of the cured rubber powder, and the powder percentage by weight to the uncured rubber. Aspects of the invention can further be defined by the composition of the cured rubber powder and the uncured rubber used to form the rubber mixture. Additionally, aspects of the invention may be defined by the resulting characteristics of rubber formed by vulcanizing (or curing) the rubber mixture. Finally, aspects of the present invention produce a rubber mixture that is free flowing. Mixing the cured rubber powder with the uncured rubber pellets provides a rubber mixture with improved handling characteristics that may be used to manufacture new rubber products from unvulcanized or uncured rubber pellets.

As used herein, the terms "cured rubber powder," "rubber powder," or "powder" may be used interchangeably and have the same meaning. The powder is produced from vulcanized rubber through a variety of processes. On average, the powder, in accordance with aspects of the present invention, can have a particle size with a diameter between 10 to 400 µm. Particularly, the powder can have a particle size with a diameter between 40 to 300 µm. More particularly, the recycled rubber powder may have a particle size with a diameter between 50 to 250 µm in diameter.

Optionally, the powder may be generated from recycled rubber. The recycled rubber powder may be recycled from a combination of sources such as manufacturing waste, tires, rubber bands, washers, stoppers, rubber outsoles, etc. in one batch; intermixing different cured rubber compositions together; or recycling from only products containing the same rubber composition as the uncured rubber composition at hand. For example, in the case that a particular rubber composition is used for the formation of a particular rubber item, rubber from old items and/or manufacturing waste having the same rubber composition may be used to form the recycled cured rubber powder.

For example, in the case of the manufacture of a shoe outsole, the rubber compositions described above may be used in both their uncured form for the manufacture of a new shoe outsole, and in their cured form as the recycled cured rubber powder (anti-stick agent) obtained from discarded shoes that have shoe outsoles manufactured from the same rubber composition.

As used herein, the terms "uncured rubber pellet," "rubber pellet," or "pellet" may be used interchangeably and have the same meaning. Unvulcanized or uncured rubber forms may be, for example, pellets, sheets, cylinders, cubes, pucks, noodles, etc. For the sake of simplicity, the uncured rubber compositions will be described as pellets herein, but aspects are not limited to the use of pellets. In various aspects, the rubber pellets can have an average pellet diameter between 1 to 10 mm, or more specifically between 3 to 6 mm, and an average pellet length of 1-15 mm, or more specifically between 3-10 mm.

Rubber is a versatile material that has been found to have a vast number of uses, one of which is, for example, in the shoe industry for the manufacture of shoe outsoles. The final cured rubber products may be formed by careful distribution of uncured rubber pellets into curing molds. Thus, the manufacturing of reproducible and consistent cured rubber products requires precise measurement and handling of the uncured rubber forms, such as rubber pellets, sheets, discs, cylinders, etc. Unfortunately, the precise handling of uncured rubber forms is challenging due to the sticky surface common to uncured rubber pellets, causing the uncured pellets to stick together and agglomerate.

Figure 1:
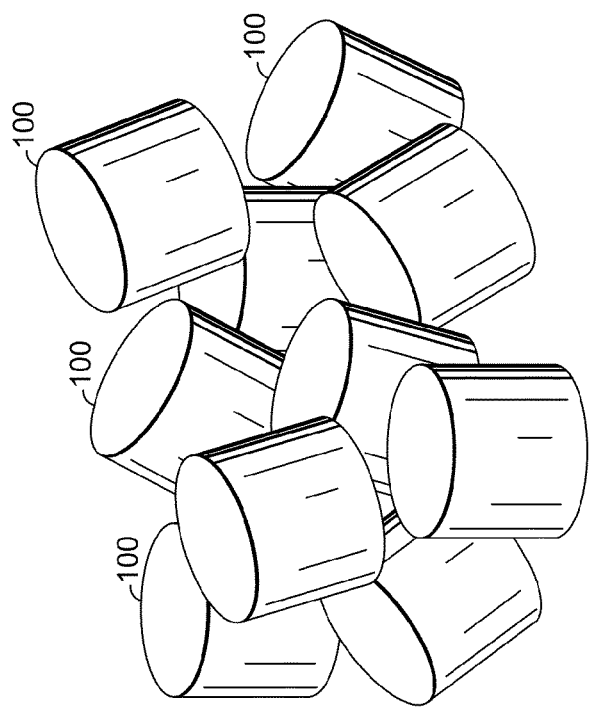
FIG. 1 is a diagram showing plurality of uncured rubber pellets that are tacky.

FIG. 1 illustrates a collection of uncured rubber pellets 100, shown as cylinders. The pellets 100 are in direct contact with the surface of other pellets 100. The uncured rubber formulation used to form the pellets, in aspects of the present invention, can have a tacky surface that causes pellets 100 to agglomerate and stick together when in contact with each other or other surfaces. The natural tackiness of the pellets 100 prevents a group of pellets from flowing freely from one point to another, for example from a rubber hopper to a dispensing device. In other words, the rubber pellets 100 are not free flowing.

FIG. 2 is a diagram showing the rubber pellets 100 coated in rubber powder 105. Essentially, the recycled rubber powder 105 acts as an anti-sticking agent by coating the surface of each uncured rubber pellet 100. By covering the surface of each rubber pellet 100 in its entirety or at least the majority, each rubber pellet 100 is prevented from sticking to the neighboring uncured rubber pellet 100 because the non-tacky cured rubber powder is effectively in contact with cured rubber powder on the exterior of the other pellets instead of the pellets 100 contacting each other. The end result is a free-flowing rubber mixture comprising both uncured rubber pellets and powder.

There is an intimate relationship between pellet size and surface area. The smaller the pellet size, the more surface area that needs to be covered by the recycled rubber powder. Thus, pellet size may play a role in the determination of a working powder percentage by weight. Due to their small size and relatively large surface area, these relatively small rubber pellets may have a greater tendency to agglomerate compared to larger pellets, making them difficult to handle. Applicants have found that coating the pellets with recycled rubber powder effectively improves the flowability of the uncured rubber pellets, making the rubber pellets easier to handle precisely, resulting in a high level of reproducibility for products made using the coated pellets.

Figure 3:
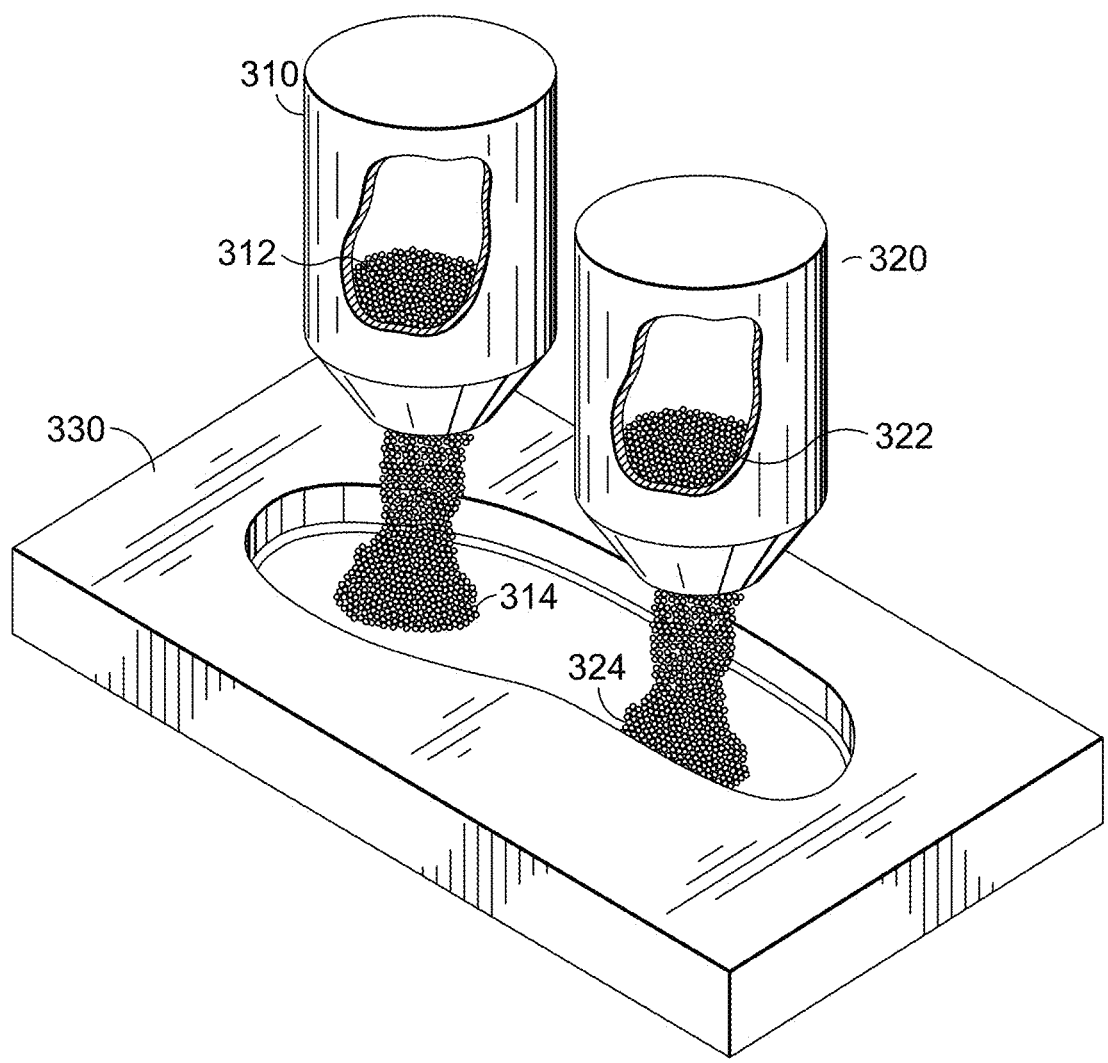
FIG. 3 is a schematic representation of coated uncured rubber pellets flowing freely from a dispenser into a rubber mold, according to aspects of the present invention.

An example of a free-flowing rubber mixture used to produce a final product is shown in FIG. 3. A first amount of a rubber mixture 312 flows from a cup 310 into a first location 314 within a mold 330. Similarly, a rubber mixture 322 flows from a cup 320 into a second location 324 within the mold 330. The rubber mixtures 312 and 322 may be the same mixture and can comprise rubber pellets, rubber powder, and vulcanizing agents. The mold 330 may then be closed and put into a heat press where heat and pressure are applied to vulcanize the rubber mixture. During or before the vulcanization process, the rubber mixture spreads into the cavity created by the mold 330.

Accordingly, the rubber powder becomes incorporated in the final cured rubber product. Thus, the amount of rubber powder present in the mixture may potentially have some impact on the physical properties of the final cured rubber product. Therefore, an aspect of the invention includes determining a working powder percentage by weight for obtaining a final cured rubber product with desirable physical properties such as elasticity, hardness, grip, etc.

The workable powder percentage by weight of rubber powder to uncured rubber may be between 0.5 to 10 percent. More precisely, the workable powder percentage by weight of recycled rubber to uncured rubber may be between 0.75 to 6 percent. Further, the workable powder percentage by weight of recycled rubber to uncured rubber may be 1.1 to 3 percent, or the workable powder percentage by weight of recycled rubber to uncured rubber may even be between 1.5 to 3 percent. As explained previously, this workable powder percentage by weight represents the amount of recycled powder that can be present for effectively improving the flowability of the uncured rubber pellets without affecting the curing properties of the uncured rubber beyond a threshold, and without adversely affecting the physiochemical properties of the final cured rubber product.

The final properties of the cured rubber product will be substantially defined by the composition of the rubber pellets selected. One aspect of the present invention is using pellets comprising environmentally preferred rubber. Applicants hereby incorporate in its entirety U.S. Pat. No. 7,211,611, titled "Rubber Compositions with Non-Petroleum Oils," issued May 1, 2007 for the purpose of describing environmentally preferred rubber.

Environmentally Preferred Rubber Overview

In brief, environmentally preferred rubber compositions may be provided having a desirable combination of health and environmental features. A used herein, environmentally preferred rubber comprises a cured rubber product or uncured rubber formulation that is substantially free of petroleum processing oil. For example, a moldable rubber composition may comprise:

a rubber resin selected from the group consisting of natural rubber, synthetic rubber, and mixtures thereof;

0.1 to 25 phr of a vegetable oil having an iodine number greater than 50;

0.1 to 10 phr S, present in a sulfur crosslinking agent;

0.01 to 2 phr TBzTD;

0.01 to 10 phr xanthogen poly sulphide;

1 to 100 phr reinforcing filler such as silica;

0.1 to 25 phr of rubber regrind, and in some aspects, no silane couple agents.

In one aspect, the above vulcanizing agents and amounts above comprise a preferred group of vulcanizing agents. For rubber outsoles, the moldable rubber compositions may preferably contain from about 0.1 to about 5 phr of vegetable oil. In other aspects, the compositions contain a maximum of 3 phr vegetable oil, or less than 3 phr. In other aspects, the compositions may contain from 0.1 to 2 phr vegetable oil. Non-limiting examples of vegetable oils include peanut oil, sunflower oil, cottonseed oil, linseed oil, soybean oil, rapeseed oil, sesame oil, safflower oil, poppy seed oil, tung oil, wheat oil, olive oil, palm oil, coconut oil, corn oil, castor oil, and mixtures thereof.

Animal derived oils may also be used at these levels. Molded rubber articles may be made by molding and curing such compositions for a time and at a temperature sufficient to effect cure.

Rubber compositions can contain natural or synthetic rubber, or mixtures of rubber, as well as rubber additives such as curing agents, accelerators, fillers and the like. The compositions also contain a non-petroleum oil, such as those of animal or vegetable origin, as processing aids during compounding and curing of the compositions. As discussed below and demonstrated in the examples, it is believed that the non-petroleum oils are at least partially incorporated covalently into the cured rubber component during the molding and especially the curing operations.

In some aspects, any rubber that can be crosslinked by a sulfur cure can be used in the compositions. Sulfur cure describes a vulcanization process typical of making rubber. In other aspects, rubber capable of being cured by a peroxide crosslinking mechanism may be used.

The rubbers may be natural rubber or synthetic rubbers. Examples of synthetic rubbers include without limitation, synthetic polyisoprenes, polybutadienes, acrylonitrile butadiene rubber, styrene acrylonitrile butadiene rubber, polychloroprene rubber, styrene-butadiene copolymer rubber, isoprene isobutylene copolymer rubber and its halogenated derivatives, ethylene-propylene-diene copolymer rubbers such as ethylene-propylene-cyclopentadiene terpolymer, ethylene-propylene-5-ethylidene-norbornene terpolymer, and ethylene-propylene-1,4-hexadiene terpolymer, butadiene-propylene copolymer rubber, butadiene-ethylene copolymer rubber, butadiene-isoprene copolymer, polypentenamer, millable urethanes and their mixtures. In one aspect, such compounds are characterized by repeating olefinic unsaturation in the backbone of the polymer, which may arise, for example, from the presence of butadiene or isoprene monomers in the polymer structure.

Conventional sulfur based curing agents may be used in the compositions of the invention. Such curing agents are well known in the art and include elemental sulfur as well as a variety of organic sulfide, disulfide and polysulfide compounds. Examples include, without limitation, vulcanizing agents such as morpholine disulfide, 2-(4'-morpholinodithio) benzothiazole, and thiuram compounds such as tetramethylthiuram disulfide, tetraethylthiuram disulfide and dipentamethylenethiuram tetrasulfide. The vulcanizing agents may be used alone or in combination with each other. In a preferred aspect, sulfur is used as the curing agent.

The rubbers may also be crosslinked with a crosslinking agent. A peroxide crosslinking agent is required to crosslink rubbers that do not contain olefinic unsaturation. The peroxide can be any organic peroxide that can decompose and yield free radicals capable of crosslinking the rubber resin. Typical methods used to induce peroxide decomposition to yield the free radicals include heat, visible light, and ultraviolet light. For most rubber compounds, heat is a preferred method of inducing decomposition because the rubber composition tends to be opaque. However, in the case of clear rubbers, UV and visible light may be used to initiate the decomposition.

The rubber compositions of the invention also in general, contain accelerators. Such accelerators and co-accelerators are known in the art and include without limitation, those based on dithiocarbamate, thiazole, amines, guanidines, xanthates, thioureas, thiurams, dithiophosphates, and sulfenamides. Non-limiting examples of accelerators include: zinc diisobutyldithiocarbamate, zinc salt of 2-mercaptobenzothiazole, hexamethylenetetramine, 1,3-diphenyl guanidine, zinc isopropyl xanthate, trimethylthiourea, tetrabenzyl thiuram disulfide, zinc O,O-di-n-butylphosphorodithioate, and N-t-butyl-2-benzothiazylsulfenamide.

It may be desired to provide rubber compositions that cure and can be processed with a minimum of emissions of potentially harmful by products. In some aspects, it is preferred to use accelerators and co-accelerators that generate nitrosamines known to be non-carcinogenic. One such accelerator is tetrabenzylthiuram disulfide. It is known to generate a nitrosamine, N-nitrosodibenzylamine, which is not carcinogenic according to published literature. A preferred co-accelerator is xanthogen poly sulphide.

The compositions generally contain reinforcing fillers. Such fillers include silica, carbon black, clay, organic fiber, inorganic metal powder, mineral powder, talc, calcium sulfate, calcium silicate, and the like. Silica is preferred in some aspects. Typical compositions for use in preparing molded rubber outsoles for athletic shoes contain about 10 to about 60 phr filler.

Properties of Rubber Mixtures after Vulcanization

As mentioned previously, aspects of the rubber mixture may be defined by the properties of the final rubber product that results from vulcanizing the rubber mixture and additional vulcanizing agents within a mold. In the examples that follow, the rubber pellet within the mixture comprises environmentally preferred rubber as described above and have been vulcanized at 150° C. and 150 Kg/cm$^2$ for five minutes. Again, the moldable rubber mixture comprises uncured pellets, cured powder, and a selection of alternate vulcanization agents mentioned above in the environmentally preferred rubber section.

Alternatively or additionally, aspects of the rubber mixture may be defined by a percentage deviation or a range of deviation from baseline characteristics. The baseline characteristics can be those found in rubber produced from a mixture that does not include the anti-tack pellets, but that is substantially similar in all other respects.

Figure 4:
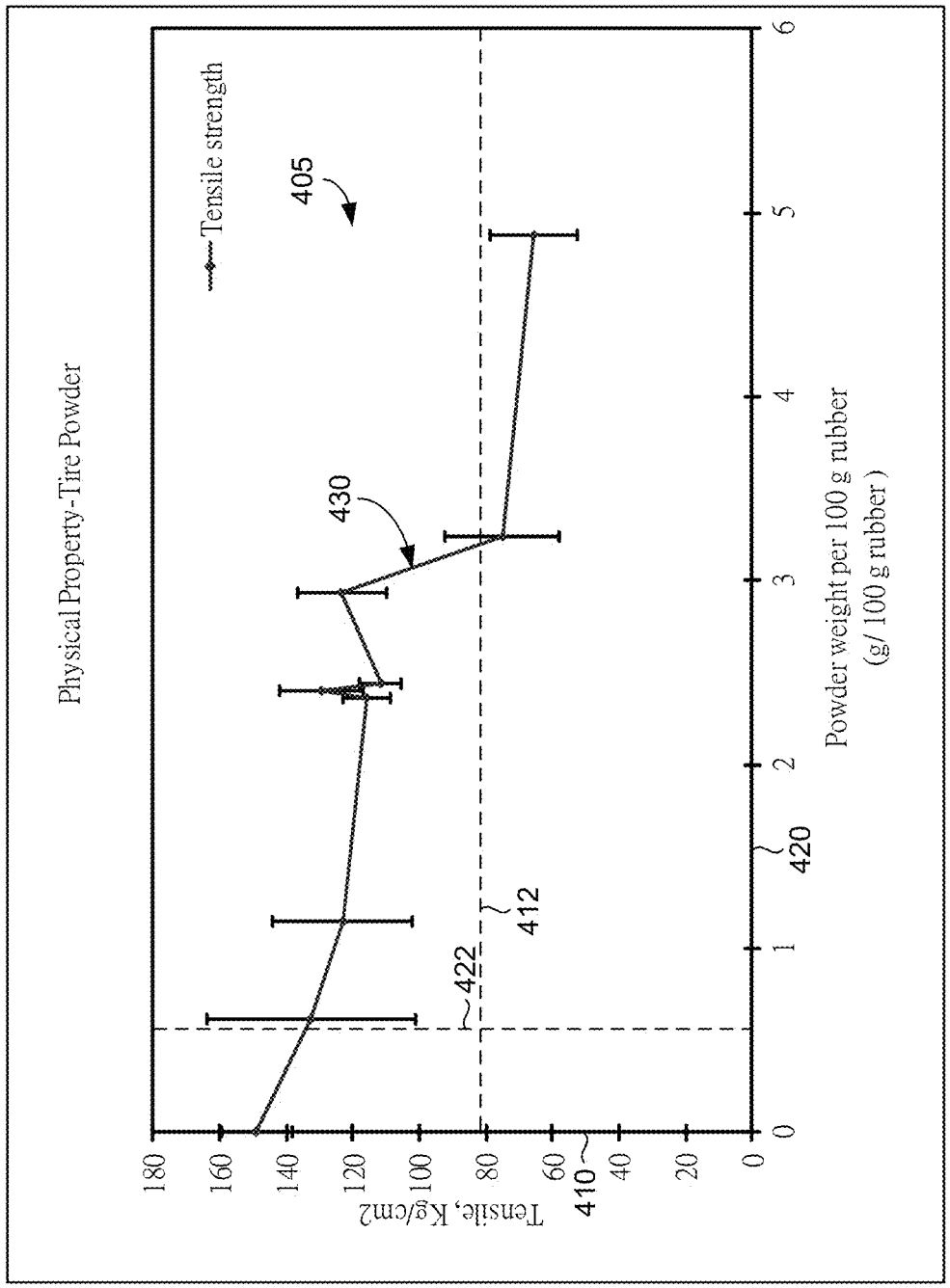
FIG. 4 is a graph of tensile strength vs. the powder percentage by weight using recycled tire powder, according to aspects of the present invention.

In one aspect, the powder percentage by weight (expressed in equation form as P %=$W_{pd}/W_{p1} \times 100$, where $W_{pd}$ is the weight of powder in the rubber mixture and $W_{p1}$ is the weight of pellets in the rubber mixture) and vulcanizing agents can be selected to form a rubber mixture that produces a vulcanized rubber product that has a tensile strength between 82 and 150 Kg/cm$^2$. FIG. 4 includes a graph 405 illustrating the post-vulcanization tensile strength of moldable rubber mixtures consistent with aspects of the present invention. The trial data used to generate graph 405 used recycled tire rubber as the cured rubber powder. The post-vulcanization tensile strength is measured in a rubber product produced by vulcanizing a particular moldable rubber mixture. As mentioned, the powder percentage by weight can affect the physical properties of cured rubber produced from the moldable rubber mixture. The powder used to produce the data shown in FIGS. 4, 5, and 6 had a diameter of 50 μm.

The x-axis 420 shows the powder percentage by weight in the uncured moldable rubber mixture. The y-axis 410 shows the resulting tensile strength of a vulcanized rubber product produced from the moldable rubber mixture. As can be seen, the line 430 generally shows that tensile strength decreases as the powder percentage by weight increases.

Separate testing has indicated that a powder percentage by weight below 0.5 fails to produce a free-flowing mixture. Accordingly, a portion of the graph to the left of line 422 falls outside of a range that is consistent with aspects of the present invention.

Further, when the moldable rubber mixture is used to produce shoe outsoles, a tensile strength above 82 is desirable to produce a quality outsole. A tensile strength of 82 is illustrated by line 412. As can be seen, the line 430 crosses the desired tensile strength threshold at some point past a powder percentage by weight of three.

The baseline tensile strength for the rubber mixture tested to produce the data points shown in FIG. 4 is approximately 150 Kg/cm$^2$. The tested rubber mixture is suitable for forming shoe components. The baseline tensile strength for rubber mixtures consistent with aspects of the present invention are not limited to the example shown and can include rubber mixtures suitable for generating components with a variety of desired characteristics. As can be seen, the powder percentage by weight at the baseline is zero. In an aspect, the powder percentage by weight selected can produce a rubber product having a tensile strength between 100% and 55% of the baseline tensile strength. The tensile strength range of 100% to 55% has been found effective to produce rubber having properties suitable for a use consistent with an intended use of the baseline rubber.

Figure 5:
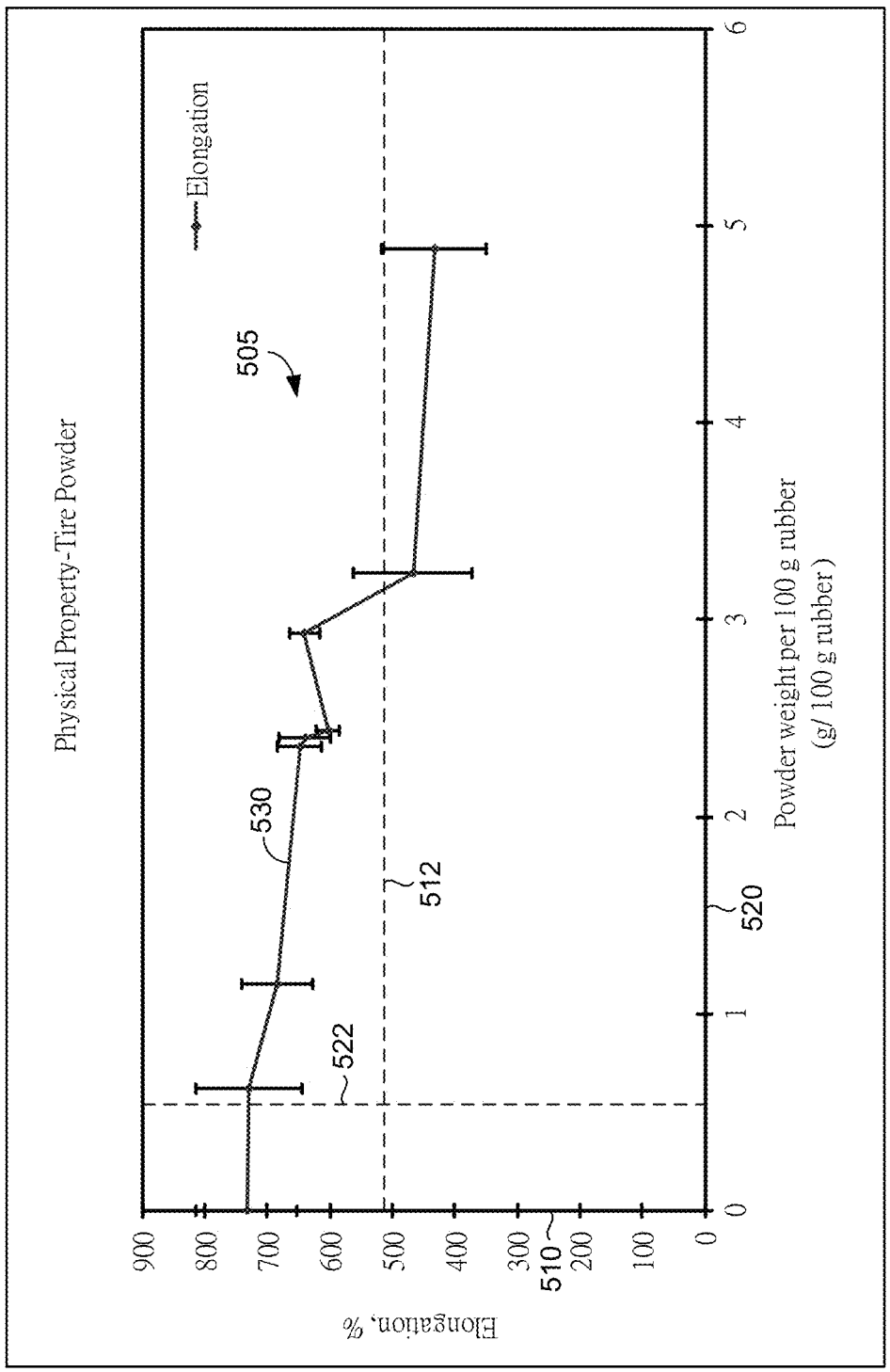
FIG. 5 is a graph of elongation percentage vs. the powder percentage by weight using recycled tire powder, according to aspects of the present invention.

In one aspect, the powder percentage by weight and vulcanizing agents can be selected to form a rubber mixture that produces a vulcanized rubber product that has an elongation percentage between 512 and 800. FIG. 5 includes a graph 505 illustrating the post-vulcanization elongation percentage of moldable rubber mixtures that are consistent with aspects of the present invention. The trial data used to generate graph 505 used recycled tire rubber as the cured rubber powder. The post-vulcanization elongation percentage is measured in a rubber product produced by vulcanizing a particular moldable rubber mixture. As mentioned, the powder percentage by weight of uncured pellets to cured powder can affect the physical properties of cured rubber produced from the moldable rubber mixture.

The x-axis 520 shows the powder percentage by weight in the uncured moldable rubber mixture. The y-axis 510 shows the resulting elongation percentage of a vulcanized rubber product produced from the moldable rubber mixture. As can be seen, the line 530 shows that elongation percentage decreases as the powder percentage by weight increases.

Separate testing has indicated that a powder percentage by weight below 0.5 fails to produce a free-flowing mixture. Accordingly, a portion of the graph to the left of line 522 is outside of a range that is consistent with aspects of the present invention.

Further, when the moldable rubber mixture is used to produce shoe outsoles, an elongation percentage above 512 is desirable to produce a quality outsole. An elongation percentage of 512 (70% of baseline) is illustrated by line 512. As can be seen, the line 530 crosses the elongation percentage threshold at some point past a powder percentage by weight of three.

The baseline elongation percentage for the rubber mixture tested to produce the data points shown in FIG. 5 is approximately 730. The tested rubber mixture is suitable for forming shoe components. The baseline elongation percentage for rubber mixtures consistent with aspects of the present invention are not limited to the example shown and can include rubber mixtures suitable for generating components with a variety of desired characteristics. As can be seen, the powder percentage by weight at the baseline is zero. In an aspect, the powder percentage by weight selected can produce a rubber product having an elongation percentage between 100% and 70% of the baseline elongation percentage. The elongation percentage range of 100% to 70% has been found effective to produce rubber having properties suitable for a use consistent with an intended use of the baseline rubber.

Figure 6:
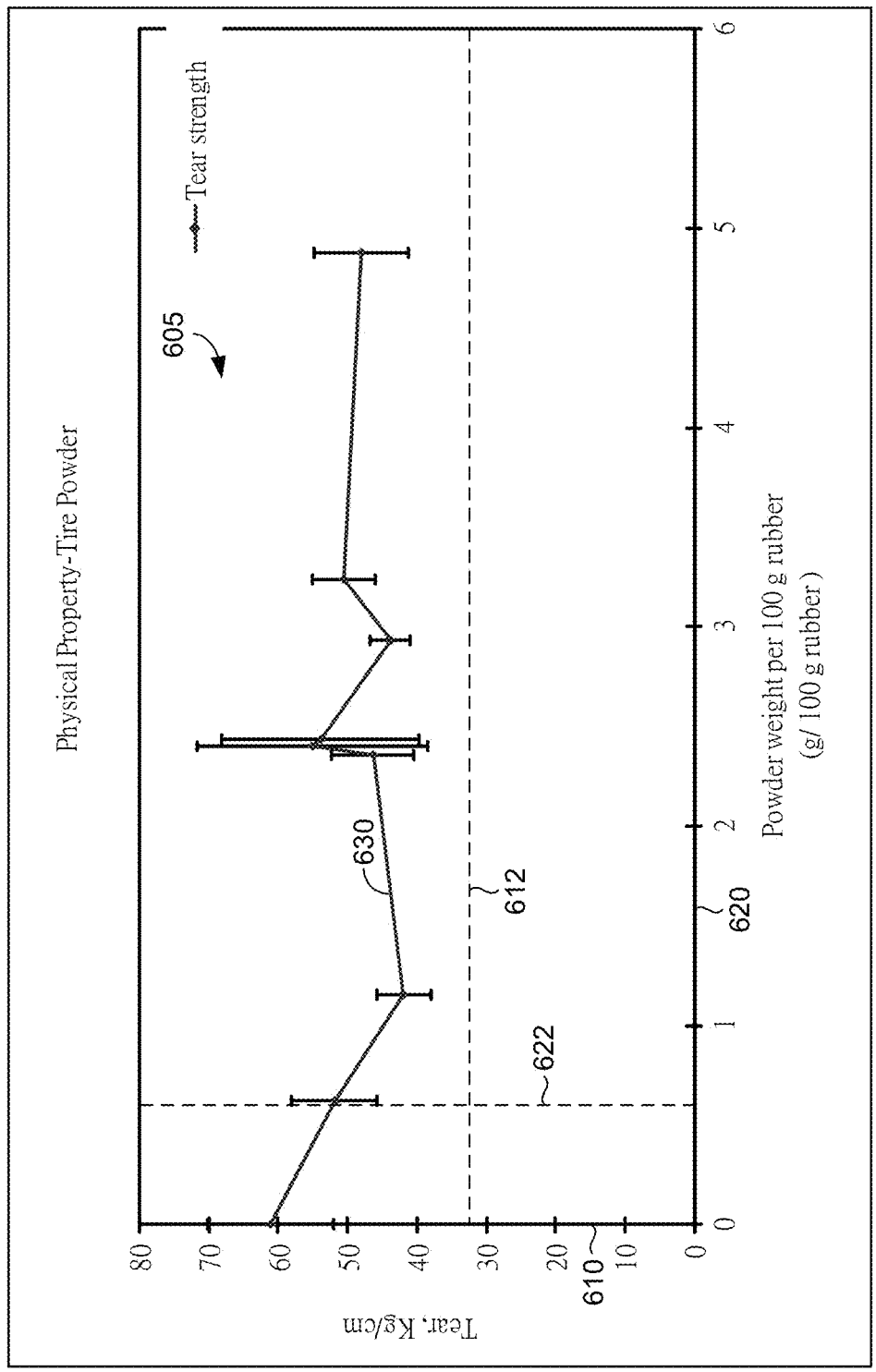
FIG. 6 is a graph of tear vs. the powder percentage by weight using recycled tire powder, according to aspects of the present invention.

In one aspect, the powder percentage by weight and vulcanizing agents can be selected to form a rubber mixture that produces a vulcanized rubber product that has a tear between 34 and 80 Kg/cm. FIG. 6 includes a graph 605 illustrating the post-vulcanization tear of moldable rubber mixtures that are consistent with aspects of the present invention. The trial data used to generate graph 605 used recycled tire rubber as the cured rubber powder. The post-vulcanization tear is measured in a rubber product produced by vulcanizing a particular moldable rubber mixture. As mentioned, the powder percentage by weight can affect the physical properties of cured rubber produced from the moldable rubber mixture.

The x-axis 620 shows the powder percentage by weight in the uncured moldable rubber mixture. The y-axis 610 shows the resulting tear of a vulcanized rubber product produced from the moldable rubber mixture. As can be seen, the line 630 shows that the tear remains relatively unchanged as the powder percentage by weight increases.

Separate testing has indicated that a powder percentage by weight below 0.5 fails to produce a free-flowing mixture. Accordingly, a portion of the graph to the left of line 622 is outside of a range that is consistent with aspects of the present invention.

Further, when the moldable rubber mixture is used to produce shoe outsoles, a tear above 34 is desirable to produce a quality outsole. A tear of 34 (55% of baseline tear) is illustrated by line 612. As can be seen, the line 630 does not cross line 612 in graph 605.

The baseline tear for the rubber mixture tested to produce the data points shown in FIG. 6 is approximately 62 Kg/cm. The tested rubber mixture is suitable for forming shoe components. The baseline tear for rubber mixtures consistent with aspects of the present invention are not limited to the example shown and can include rubber mixtures suitable for generating components with a variety of desired characteristics. As can be seen, the powder percentage by weight at the baseline is zero. In an aspect, the powder percentage by weight selected can produce a rubber product having a tear between 100% and 55% of the baseline tear. The tear range of 100% to 55% has been found effective to produce rubber having properties suitable for a use consistent with an intended use of the baseline rubber.

Figure 7:
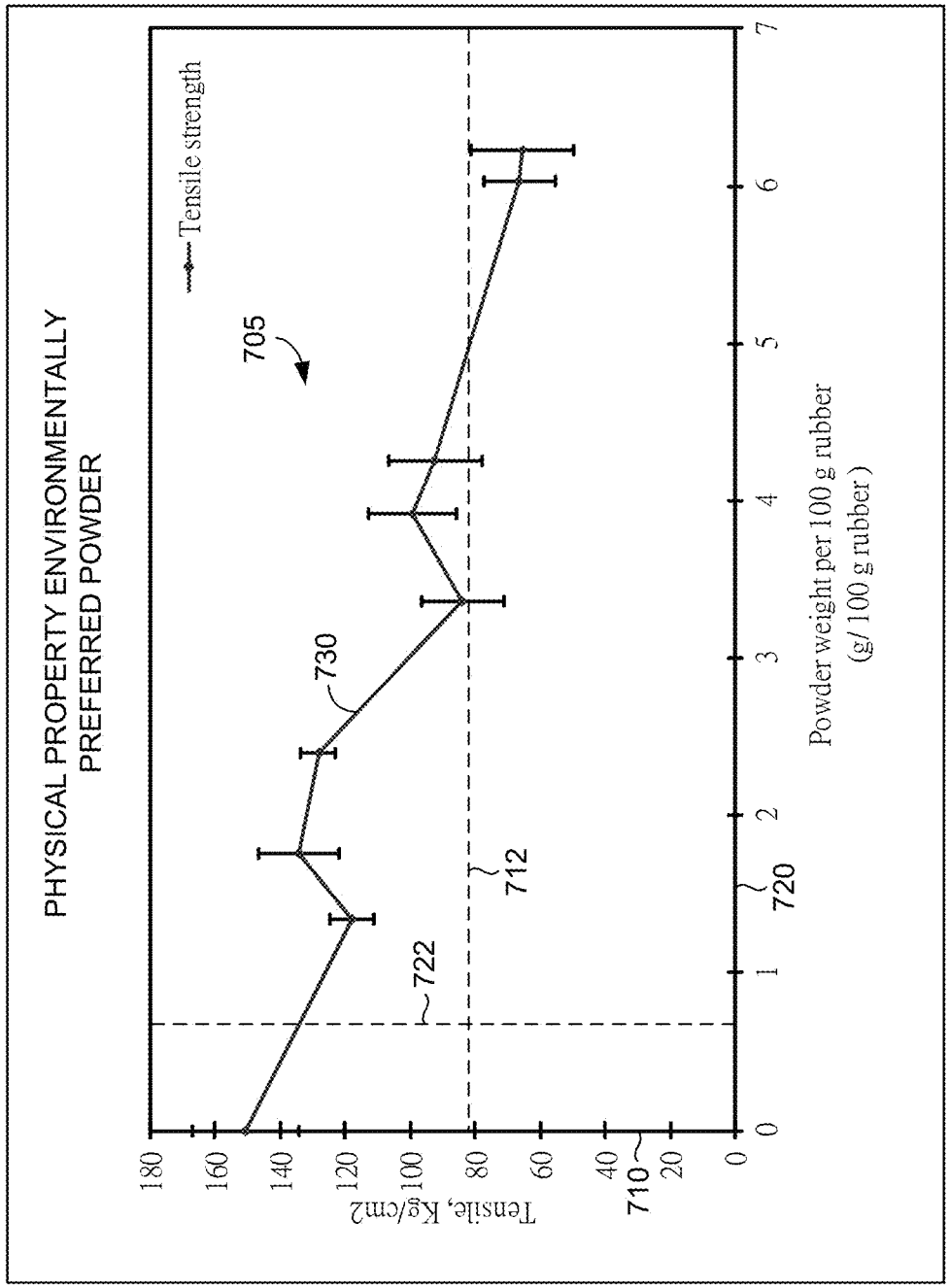
FIG. 7 is a graph of tensile strength vs. the powder percentage by weight using ground environmentally preferred rubber powder, according to aspects of the present invention.

As mentioned, in one aspect, a powder percentage by weight and vulcanizing agents can be selected to form a rubber mixture that produces a vulcanized rubber product that has a tensile strength between 82 and 150 Kg/cm$^2$. FIG. 7 includes a graph 705 illustrating the post-vulcanization tensile strength of moldable rubber mixtures that are consistent with aspects of the present invention. The trial data used to generate graph 705 used recycled environmentally preferred rubber as the cured rubber powder. In other words, the formulation of the cured pellets closely resembles the overall formulation of the moldable rubber mixture. The post-vulcanization tensile strength is measured in a rubber product produced by vulcanizing a particular moldable rubber mixture. As mentioned, the powder percentage by weight can affect the physical properties of cured rubber produced from the moldable rubber mixture. The powder used to produce the data shown in FIGS. 7, 8, and 9 had a diameter of 250 µm.

The x-axis 720 shows the powder percentage by weight in the uncured moldable rubble mixture. The y-axis 710 shows the resulting tensile strength of a vulcanized rubber product produced from the moldable rubber mixture. As can be seen, the line 730 shows that tensile strength decreases as the powder percentage by weight increases.

Separate testing has indicated that a powder percentage by weight below 0.5 fails to produce a free-flowing mixture. Accordingly, a portion of the graph to the left of line 722 is outside of a range that is consistent with aspects of the present invention.

Further, when the moldable rubber mixture is used to produce shoe outsoles, a tensile strength above 82 is desirable to produce a quality outsole. A tensile strength of 82 is illustrated by line 712. As can be seen, the line 730 crosses the desired tensile strength threshold at some point around a powder percentage by weight of five. Notice that this differs from graph 405 where the tensile strength line 430 crossed the threshold closer to three. Graph 405 was produced in a trial using recycled tire rubber, rather than the environmentally preferred rubber used to produce the data used to make graph 705. This illustrates that the properties of the cured powder can produce cured rubber products having different properties.

The baseline tensile strength for the rubber mixture tested to produce the data points shown in FIG. 7 is approximately 150 Kg/cm$^2$. As mentioned, in an aspect, the powder percentage by weight selected can produce a rubber product having a tensile strength between 100% and 55% of the baseline tensile strength. The tensile strength range of 100% to 55% has been found effective to produce rubber having properties suitable for a use consistent with an intended use of the baseline rubber.

Figure 8:
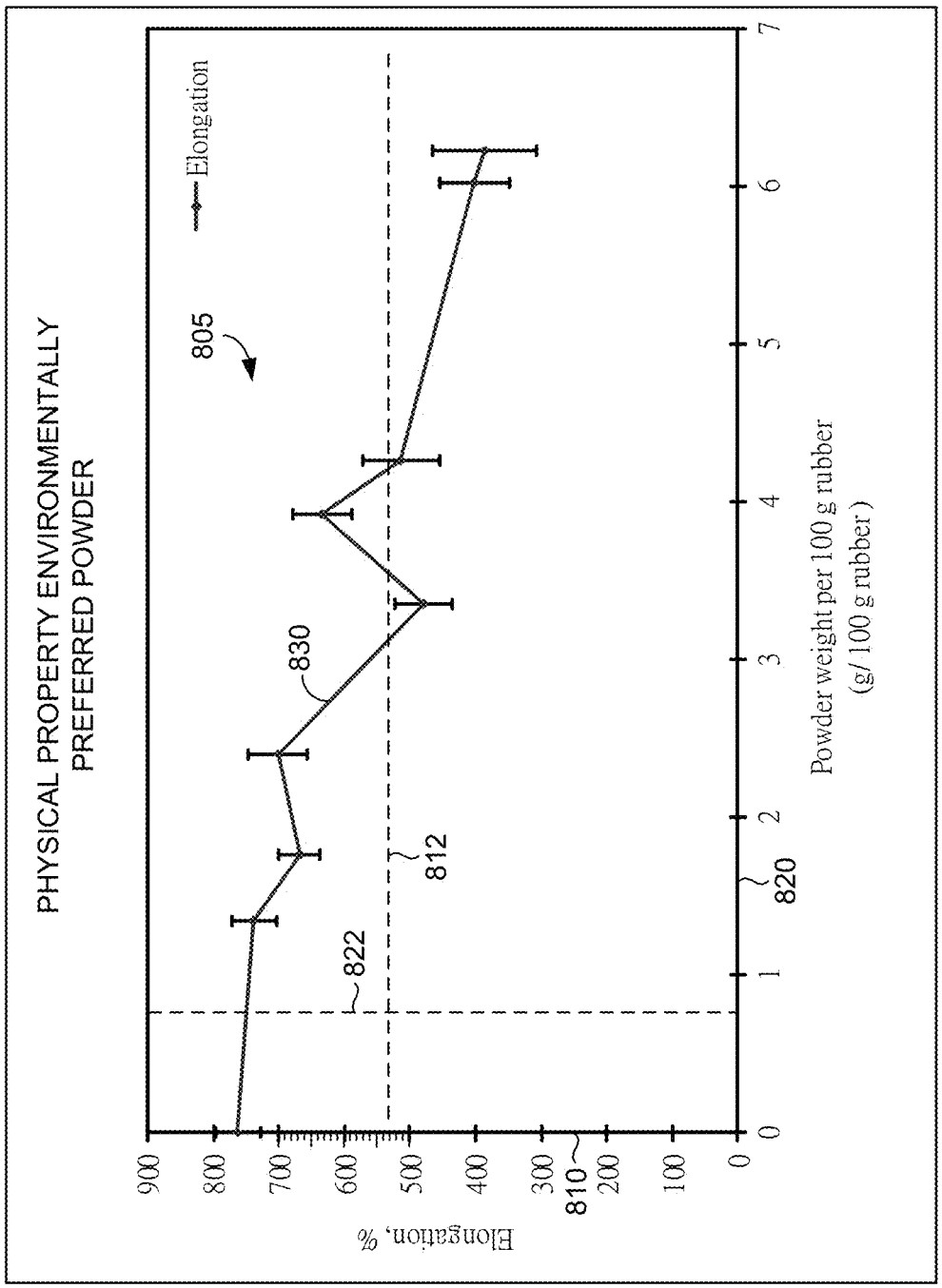
FIG. 8 is a graph of elongation percentage vs. the powder percentage by weight using ground environmentally preferred rubber powder, according to aspects of the present invention.

As mentioned, in one aspect, a powder percentage by weight and vulcanizing agents can be selected to form a rubber mixture that produces a vulcanized rubber product that has an elongation percentage between 532 and 800. FIG. 8 includes a graph 805 illustrating the post-vulcanization elongation percentage of moldable rubber mixtures that are consistent with aspects of the present invention. The trial data used to generate graph 805 used recycled environmentally preferred rubber as the cured rubber powder. In other words, the formulation of the cured pellets closely resembles the overall formulation of the moldable rubber mixture. The post-vulcanization elongation percentage is measured in a rubber product produced by vulcanizing a particular moldable rubber mixture. As mentioned, the powder percentage by weight can affect the physical properties of cured rubber produced from the moldable rubber mixture.

The x-axis 820 shows the powder percentage by weight in the uncured moldable rubber mixture. The y-axis 810 shows the resulting elongation percentage of a vulcanized rubber product produced from the moldable rubber mixture. As can be seen, the line 830 shows that elongation percentage decreases as the powder percentage by weight increases.

Separate testing has indicated that a powder percentage by weight below 0.5 fails to produce a free-flowing mixture. Accordingly, a portion of the graph to the left of line 822 is outside of a range that is consistent with aspects of the present invention.

Further, when the moldable rubber mixture is used to produce shoe outsoles, an elongation percentage above 532 is desirable to produce a quality outsole. An elongation percentage of 532 (70% of baseline) is illustrated by line 812. As can be seen, the line 830 crosses the elongation percentage threshold at some point between a powder percentage by weight of three and four.

The baseline elongation percentage for the rubber mixture tested to produce the data points shown in FIG. 8 is approximately 760. The tested rubber mixture is suitable for forming shoe components. In an aspect, the powder percentage by weight selected can produce a rubber product having an elongation percentage between 100% and 70% of the baseline elongation percentage. The elongation percentage range of 100% to 70% has been found effective to produce rubber having properties suitable for a use consistent with an intended use of the baseline rubber.

Figure 9:
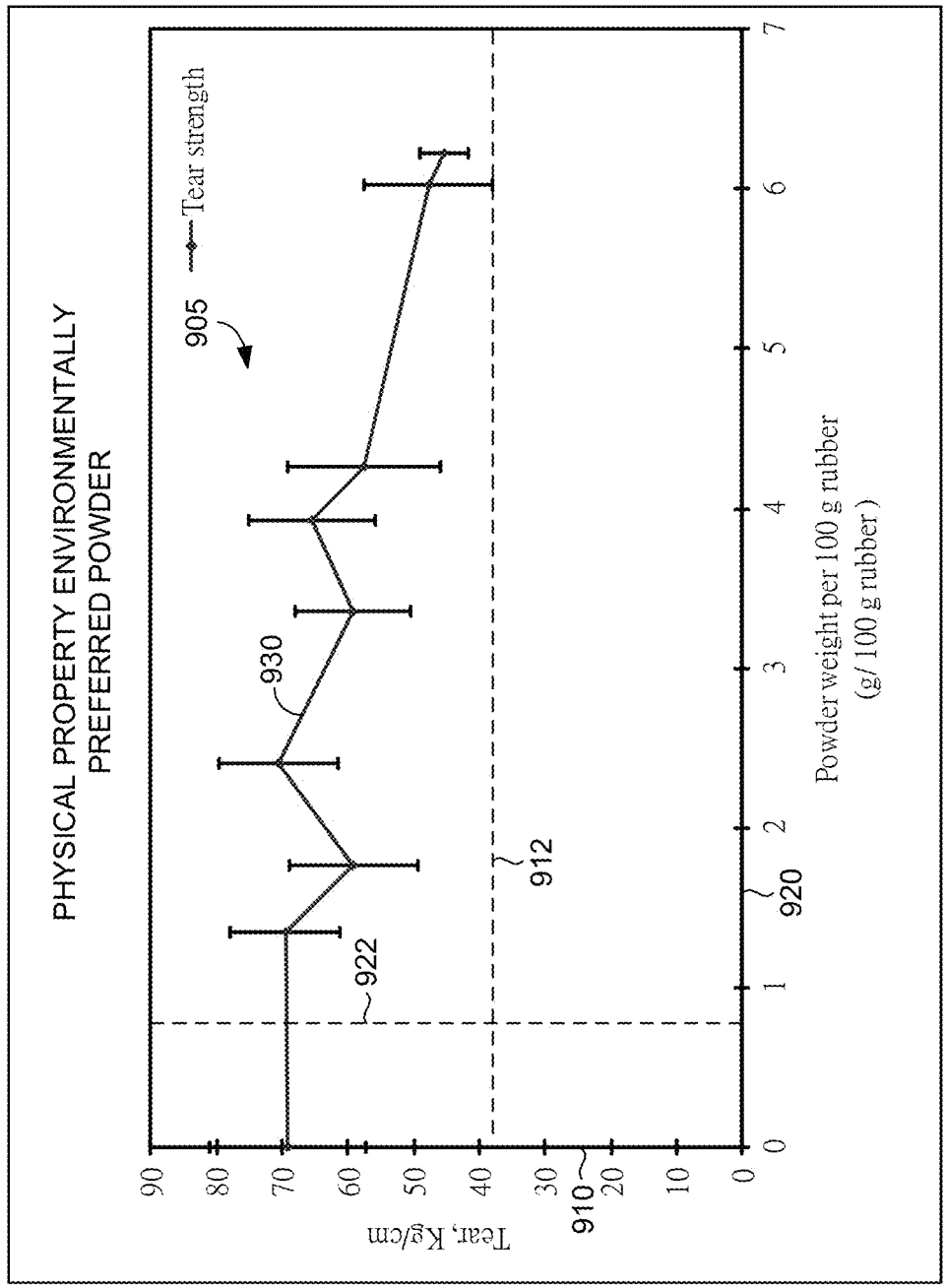
FIG. 9 is a graph of tear vs. the powder percentage by weight using ground environmentally preferred rubber powder, according to aspects of the present invention.

As mentioned, in one aspect, a powder percentage by weight and vulcanizing agents can be selected to form a rubber mixture that produces a vulcanized rubber product that has a tear between 38 and 80 Kg/cm. FIG. 9 includes a graph 905 illustrating the post-vulcanization tear of moldable rubber mixtures that are consistent with aspects of the present invention. The trial data used to generate graph 905 used recycled environmentally preferred rubber as the cured rubber powder. In other words, the formulation of the cured pellets closely resembles the overall formulation of the moldable rubber mixture. The post-vulcanization tear is measured in a rubber product produced by vulcanizing a particular moldable rubber mixture. As mentioned, the percentage of uncured pellets to cured powder can affect the physical properties of cured rubber produced from the moldable rubber mixture.

The x-axis 920 shows the powder percentage by weight in the uncured moldable rubber mixture. The y-axis 910 shows the resulting tear of a vulcanized rubber product produced from the moldable rubber mixture. As can be seen, the line 930 shows that tear decreases as the powder percentage by weight increases.

Separate testing has indicated that a powder percentage by weight below 0.5 fails to produce a free-flowing mixture. Accordingly, a portion of the graph to the left of line 922 is outside of a range that is consistent with aspects of the present invention.

Further, when the moldable rubber mixture is used to produce shoe outsoles, a tear above 38 is desirable to produce a quality outsole. A tear of 38 is illustrated by line 912. As can be seen, the line 930 does not cross line 912 in graph 905.

The baseline tear for the rubber mixture tested to produce the data points shown in FIG. 9 is approximately 69 Kg/cm. As mentioned, in an aspect, the powder percentage by weight selected can produce a rubber product having a tear between 100% and 55% of the baseline tensile strength. The tear range of 100% to 55% has been found effective to produce rubber having properties suitable for a use consistent with an intended use of the baseline rubber.

Method for Making the Rubber Mixture

According to an aspect of the present invention, the uncured rubber pellets may be coated with the recycled rubber powder in batches. For example, the uncured rubber pellets may be coated by employing industrial mixers that employ solutions such as, for example, water, air, or any other inert solution suitable for the mixing and coating process. Broadly, these methods may be classified into two categories: dry mixing and wet mixing.

The mixer may be any kind of industrial mixer suitable for the effective distribution of the recycled rubber powder throughout the uncured rubber pellet batch. For example, the mixer may be a tank equipped with a mechanical agitator or, in the alternative, a tank mixing eductor employing highly pressurized solutions. The uncured rubber pellets, the recycled rubber powder, and the inert solution may be supplied to the mixer tank simultaneously or, may be supplied to the tank in any predetermined order suitable for the particular type of equipment being employed for the coating process.

If the solution used was, for example, water, the coated uncured rubber pellets may be dried off at a temperature that is at least room temperature, but not equal to or higher than the curing temperature for the uncured rubber composition. If the solution used was, for example, air, the drying step would not be necessary. The coated and dried rubber pellets are then ready to be used in the manufacture of a rubber product.

In the event that the solution used is water, for example, the recycled rubber powder-to-water percent by weight may be between 1 to 35 percent, between 1 to 25 percent, or between 2 to 20 percent, or between 2 to 10 percent.

Further, the uncured rubber pellet-to-water percent by weight can be between 1 to 70 percent, or between 1 to 60 percent, or between 5 to 58 percent, or between 10 to 57 percent, or between 10 to 35 percent.

Figure 10:
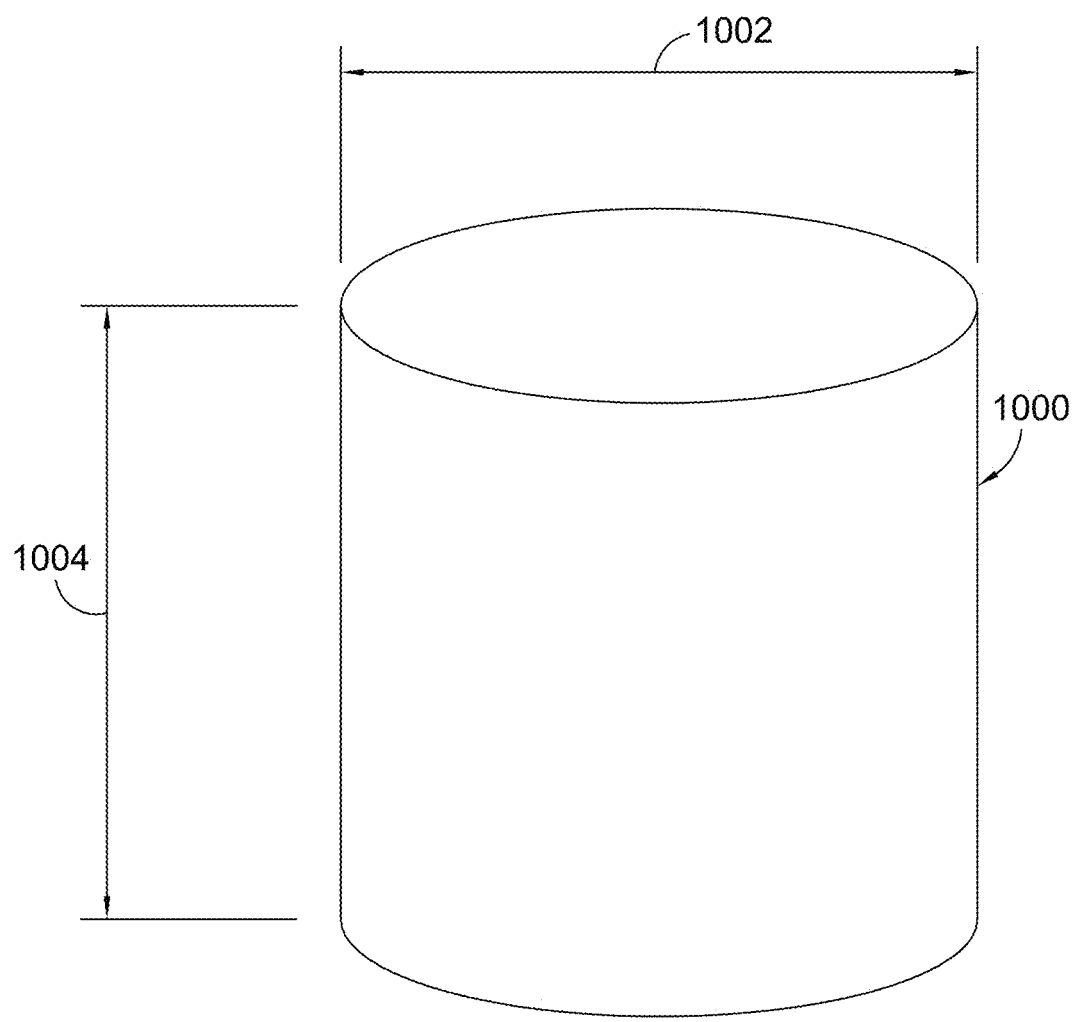
FIG. 10 is a diagram illustrating a cylinder's length and diameter.

FIG. 10 shows an exemplary cylinder 1000. The cylinder 1000 has a length 1002 and a height 1004. As previously mentioned, in various aspects the uncured rubber pellets may be in the form of cylinders. In various aspects, the rubber cylinder can have a diameter between 1 to 10 mm, or more specifically between 3 to 6 mm, and an average length of 1-15 mm, or more specifically between 3-10 mm.

Many different arrangements of the various components depicted, as well as components not shown, are possible without departing from the spirit and scope of the several embodiments of the invention. Embodiments of the invention have been described with the intent to be illustrative rather than restrictive. It will be understood that certain features and subcombinations are of utility and may be employed without reference to other features and subcombinations and are contemplated within the scope of the claims.

Having thus described the invention, what is claimed is:

1. A moldable rubber mixture comprising:
   uncured rubber pellets; and
   an anti-stick agent comprising a cured rubber powder, wherein the cured rubber powder in the moldable rubber mixture is between 0.5 to 10 percent by weight of the uncured rubber pellets in the moldable rubber mixture.

2. The moldable rubber mixture of claim 1, wherein at least one of the cured rubber powder or the uncured rubber pellets are substantially free from petroleum processing oil.

3. The moldable rubber mixture of claim 1, wherein the cured rubber powder substantially comprises cured rubber particles having a particle size between 50 and 250 p.m.

4. The moldable rubber mixture of claim 1, wherein the uncured rubber pellets have a diameter of between 1 and 10 mm and a length of between 1 and 15 mm.

5. The moldable rubber mixture of claim 1, wherein the uncured rubber pellets have a diameter of between 3 and 6 mm and a length of between 3 and 10 mm.

6. The moldable rubber mixture of claim 1, wherein the cured rubber powder substantially comprises cured rubber particles having a particle size of between 50 and 250 pm, the uncured rubber pellets have a diameter of between 3 and 6 mm and a length of between 3 and 10 mm, and a powder percentage by weight is between 0.75 and 3 percent.

7. The moldable rubber mixture of claim 1, wherein the cured rubber powder comprises recycled vulcanized rubber material.

8. A moldable rubber mixture comprising:
   uncured rubber pellets having a diameter between 1 and 10 mm and a length between 1 and 15 mm; and
   an anti-stick agent comprising a cured rubber powder with a particle size between 50 and 250 pm, wherein the cured rubber powder in the moldable rubber mixture is between 0.5 to 10 percent by weight of the uncured rubber pellets in the moldable rubber mixture.

9. The moldable rubber mixture of claim 8, wherein vulcanized rubber produced from the moldable rubber mixture has a tensile strength between 100% and 55% of a baseline tensile strength of a vulcanized rubber produced from a baseline rubber moldable mixture that does not include the anti-stick agent.

10. The moldable rubber mixture of claim 8, wherein vulcanized rubber produced from the moldable rubber mixture has an elongation percentage between 100% and 70% of a baseline elongation percentage of a vulcanized rubber produced from a baseline rubber moldable mixture that does not include the anti-stick agent.

11. The moldable rubber mixture of claim 8, wherein vulcanized rubber produced from the moldable rubber mixture has a tear between 100% and 55% of a baseline tear of a vulcanized rubber produced from a baseline rubber moldable mixture that does not include the anti-stick agent.

12. The moldable rubber mixture of claim 8, wherein the uncured rubber pellets have the diameter of between 3 and 6 mm and the length of between 3 and 10 mm.

13. The moldable rubber mixture of claim 8, wherein the cured rubber powder in the moldable rubber mixture is between 0.5 to 10 percent by weight of the uncured rubber pellets in the moldable rubber mixture.

14. The moldable rubber mixture of claim 8, wherein the cured rubber powder and the uncured rubber pellets are substantially free from petroleum processing oil.

15. A moldable rubber mixture comprising:
   a cured rubber powder;
   uncured rubber pellets, wherein the cured rubber powder in the moldable rubber mixture is between 0.5 to 10 percent by weight of the uncured rubber pellets in the moldable rubber mixture;
   wherein one or both of the cured rubber powder and the uncured rubber pellets are comprised of:
      a non-petroleum processing oil,
      a rubber regrind,
      a cross-linking agent,
      a reinforcing filler,
      an accelerator, and
      a curing activator; and
   wherein the moldable rubber mixture is free flowing.

16. The moldable rubber mixture of claim 15, wherein the cured rubber powder substantially comprises cured rubber particles having a particle size of between 50 and 250 pm, the uncured rubber pellets have a diameter of between 3 and 6 mm and a length of between 3 and 10 mm.

17. The moldable rubber mixture of claim 15, wherein vulcanized rubber produced from the moldable rubber mixture has a tensile strength between 100% and 55% of a baseline tensile strength of a vulcanized rubber produced from a baseline rubber moldable mixture that does not include the cured rubber powder.

18. The moldable rubber mixture of claim 15, wherein vulcanized rubber produced from the moldable rubber mixture has an elongation percentage between 100% and 70% of a baseline elongation percentage of a vulcanized rubber produced from a baseline rubber moldable mixture that does not include the cured rubber powder.

19. The moldable rubber mixture of claim 15, wherein vulcanized rubber produced from the moldable rubber mixture has a tear between 100% and 55% of a baseline tear of a vulcanized rubber produced from a baseline rubber moldable mixture that does not include the cured rubber powder.

* * * * *